United States Patent [19]

Burkhardt et al.

[11] 4,157,281
[45] Jun. 5, 1979

[54] METHOD AND APPARATUS FOR RECLAIMING SOLVENTS FROM SOLVENT-BEARING SLUDGE MATERIAL

[75] Inventors: Daniel F. Burkhardt; Carl A. Evers; Anthony H. Kohnen, all of Kettering; Robert L. Kohnen, Centerville; Gary E. Smith, Alpha; Thomas J. Wittman, Dayton, all of Ohio

[73] Assignee: Systems Technology Corporation, Xenia, Ohio

[21] Appl. No.: 815,646

[22] Filed: Jul. 14, 1977

[51] Int. Cl.² .............................................. B01D 1/14
[52] U.S. Cl. .................................. 202/176; 202/234; 202/261; 159/165; 137/539; 222/518; 203/47
[58] Field of Search ........... 159/1 RW, DIG. 33, 165; 202/234, 176, 261, 262, 265; 203/39, 47; 34/9, 179; 222/518, 496; 137/543.17, 539

[56] References Cited
U.S. PATENT DOCUMENTS

| | | | |
|---|---|---|---|
| 1,997,980 | 4/1935 | Smith | 159/DIG. 33 |
| 2,584,716 | 2/1952 | Koppel | 137/539 |
| 2,609,975 | 9/1952 | Senger | 222/496 |
| 2,895,884 | 7/1959 | Switzer | 202/262 |
| 2,929,150 | 3/1960 | Johnston | 34/9 |
| 3,929,586 | 12/1975 | Stikkers | 203/37 |

OTHER PUBLICATIONS
Chemical Engineering, 11/22/76, p. 93

Primary Examiner—Hiram H. Bernstein

[57] ABSTRACT

A solvent-bearing sludge material is pumped by a variable speed positive displacement pump from a preparation mixing tank through a pressure responsive valve which distributes the material into the upper portion of an insulated distilling or processing vessel. Steam is introduced into the lower portion of the vessel and mixes with the material to volatize the solvents which are directed through a condenser and pump to a storage tank. Water and suspended solid particles are continuously pumped from the bottom of the vessel to an insulated settling tank where the solid particles settle and are continuously removed by a drag-out conveyor. The hot water in the upper portion of the settling tank is pumped back into the vessel, and may have sufficient velocity to increase agitation within the vessel, or a mechanical agitator may be installed within the bottom portion of the vessel. The continuous feed of material into the vessel and the continuous removal of hot water and suspended particles from the vessel cooperate with continuous separation and removal of the solid particles and the return of the hot water to the vessel to eliminate agglomeration of the solids within the bottom portion of the vessel and to provide for an effective and efficient solvent reclaiming process.

11 Claims, 2 Drawing Figures

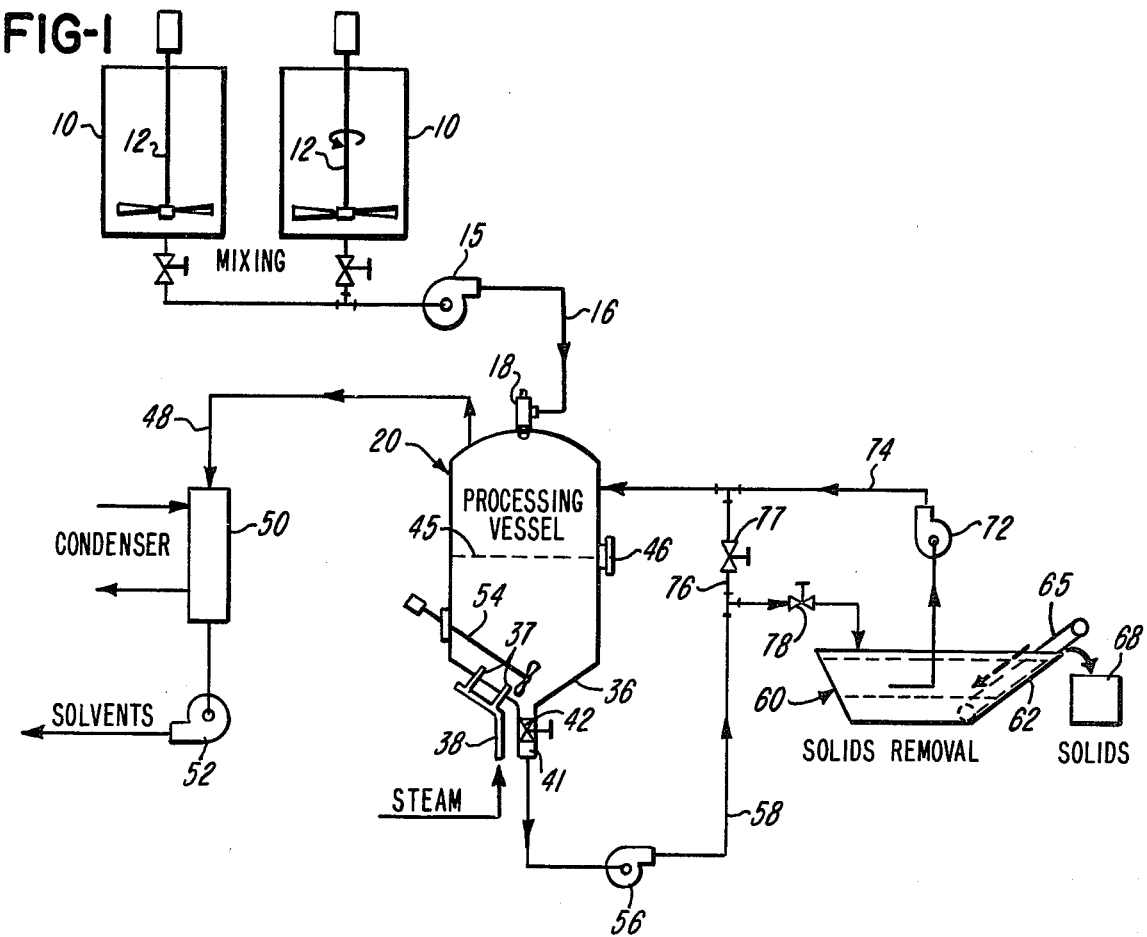
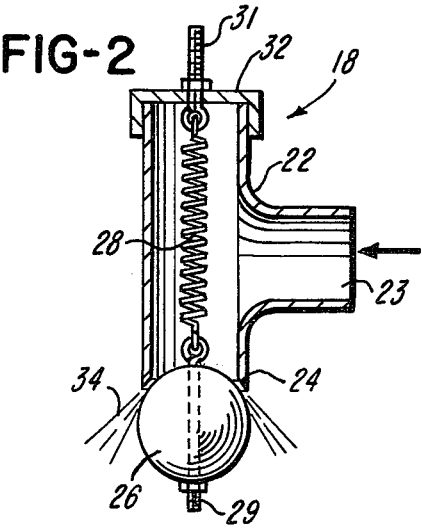

METHOD AND APPARATUS FOR RECLAIMING SOLVENTS FROM SOLVENT-BEARING SLUDGE MATERIAL

BACKGROUND OF THE INVENTION

In the art of reclaiming hydrocarbon solvents from solvent-bearing waste sludges such as produced in the paint and dry cleaning industries, for example, as disclosed in U.S. Pat. No. 3,929,586, a material such as lime is mixed with the solvent-bearing sludge, and a batch of the mixture is fed into a processing vessel. Steam is introduced into the vessel to volatize the solvent, and the steam and the solvent vapor are directed from the vessel through a condenser from which the condensed solvent and water are pumped to a storage tank. The solids within the mixture are collected within the processing vessel, and after a predetermined processing period, the hot water and solids are pumped from the vessel to a storage tank. Subsequently, the mixture is passed through a filter system which separates the solid particles or solids from the water so that the water may be reused within the processing vessel and the solids may be disposed of as waste.

One of the problems resulting from collecting the solid particles within the processing vessel is that the particles tend to agglomerate into a solid mass which is difficult to remove from the vessel. When this occurs, the agglomerated mass of solids must be broken up into sufficiently small particles which can be pumped or otherwise removed from the bottom outlet of the vessel.

SUMMARY OF THE INVENTION

The present invention is directed to an improved solvent reclaiming system which is adapted for continuous operation and for receiving a continuous supply of solvent bearing material. The system of the invention also provides for continuously removing water or other liquid carrier and suspended solids from the bottom of the processing or distilling vessel to prevent an accumulation of solids within the vessel and to maintain a substantially constant liquid level within the processing vessel. While solids and hot water or liquid carrier are being continuously removed from the bottom of the vessel, the system further provides for settling of the solids from the liquid carrier in a settling tank and for simultaneously recirculating the liquid carrier back into the vessel. A mechanical agitator may be installed within the vessel or the water may be returned at a high velocity to produce agitation of the solvent-bearing material within the vessel with the hot liquid carrier within the vessel. As a result, the present invention provides for efficiently reclaiming a high percentage of the solvents from a solvent bearing material and also for producing solids which can be safely buried in the ground.

Other features and advantages of the invention will be apparent from the following description, the accompanying drawing and the appended claims.

BRIEF DESCRIPTION OF THE DRAWING

FIG. 1 is a diagrammatic illustration of a system constructed in accordance with the invention for reclaiming solvents from a solvent-bearing sludge material; and FIG. 2 is an enlarged axial section of a pressure responsive diffusing valve installed within the top portion of the processing vessel shown in FIG. 1.

DESCRIPTION OF THE PREFERRED EMBODIMENT

As illustrated in FIG. 1, a solvent-bearing sludge material is supplied to two or more storage tanks 10 which are provided with corresponding motor driven mixers or agitators 12. As mentioned above, typical solvent-bearing sludges or materials which may be treated by the process and apparatus of the present invention, include a residue sludge produced during the manufacturing of paint, a waste sludge containing an organic cleaning solvent, and "still bottoms" discharged from a conventional solvent redistillation system. A material such as lime or flyash may be added to the sludge within a tank 10 and thoroughly mixed into the sludge by the agitator 12 to provide a seed or substrate for the volatile solvent.

The sludge material or mixture is fed from the bottoms of the tanks 10 by a positive displacement pump 15 which is driven by a variable speed electric motor. The pump 15 supplies the mixture through a line 16 to a distributing valve 18 located within the top of an insulated distilling or processing vessel 20. As shown in FIG. 2, the distributing valve 18 generally includes a T-shaped valve body 22 having an inlet 23 connected to the line 16. The outlet of the valve body 22 is defined by an annular seat 24 which is normally closed by a spherical valve member 26 which is urged against valve seat 24 by a coil tension spring 28. The spring 28 has one end connected to the valve member 26 by an I-bolt 29 and an opposite end connected by an I-bolt 31 to a closure cap 32 for the valve body 22.

As the sludge mixture is pumped through the line 16 at a predetermined flow rate selected by adjusting the motor for the pump 15, the mixture is distributed within the upper portion of the vessel 20 by an annular spray pattern 34 discharged between the spherical valve member 26 and the annular seat 24, as illustrated in FIG. 2. In the event that this annular discharge orifice becomes clogged or blocked, for example, by a foreign object within the sludge material, the pressure increases within the line 16 and the valve member 24 responds to the increased pressure by moving downwardly and increasing the size of the annular orifice so that the foreign object is released.

The cylindrical processing or distilling vessel 20 is insulated by a surrounding jacket (not shown) of insulating material so that the heat loss from the vessel is minimized. The vessel 20 has a generally conical bottom wall 36 through which project steam supply tubes 37 extending from a manifold 38 connected to a supply of pressurized steam. An outlet 41 is formed within the bottom center of the vessel 20 and is provided with a gate valve 42.

As pressurized steam is introduced into the vessel 20 through the steam supply tubes 37, a portion of the steam condenses within the vessel, and the hot water bath suspends the solids of the sludge mixture supplied to the vessel through the valve 18. The hot water within the vessel 20 is maintained at a level 45 which can be detected through an external sight glass 46. The water within the vessel 20 approaches a boiling temperature, and the hot water and steam escaping from the surface of the water volatizes or vaporizes the solvents within the sludge mixture distributed by the valve 18. The steam and volatized solvents are discharged from the vessel 20 through a line 48 which connects with a water cooled condenser 50. The condensed solvent and water are discharged from the condenser 50 and are fed by a pump 52 to a solvent storage tank.

The heavier solids within the bottom portion of the vessel 20 are held in suspension within the hot water by means of a motor driven agitator 54. The water and suspended solids are continuously discharged through the outlet 41 and are fed by centrifugal pump 56 through a line 58 to a settling tank 60. The tank 60 has an inclined bottom wall 62 which supports an endless chain type drag-out conveyor 65. As solids or solid particles settle within the tank 60, they are continuously removed by the conveyor 65 and are collected within a suitable transport container 68. The hot water within the upper portion of the settling tank 60 is fed by a motor driven centrifugal pump 72 through a line 74 back into the upper portion of the vessel 20. The return water may be fed through a line (not shown) extending downwardly within the center of the vessel 20 and with substantial velocity so that the water stream contributes to effective agitation of the solids within hot water in the lower portion of the vessel to hold the solids in suspension without using the agitator 54.

The settling tank 60 and the fluid lines 58 and 74 are completely insulated to minimize heat loss during the settling process and during the recirculation of hot water. Another insulated line 76 connects the lines 55 and 74, and a set of valves 77 and 78 are provided in the lines 76 and 58 to provide the option of direct recirculation of the water and suspended solids and for bypassing the settling tank 60 in the event that the solids being pumped from the vessel 20 have a higher percentage of solvents than desired.

From the drawing and the above description, it is apparent that the solvent reclaiming method and apparatus of the present invention provides desirable features and advantages. For example, the controlled continuous flow of solvent-bearing waste material into the distilling vessel 20 and the continuous flow of hot water and suspended solids from the bottom of the vessel 20 into the settling tank 60 cooperate with the continuous removal of solids from the settlng tank 60 by the drag out conveyor 65 and the continuous return of hot water through the line 74 to the vessel 20 to provide for a continuous and efficient solvent reclaiming system.

In addition, the system avoids a build up or agglomeration of solids within the distilling vessel 20 and within the settling tank 60, and thus eliminates the need for breaking up the solids and the associated down time of the vessel. The continuous system also provides for minimizing the volume of hot water in the vessel 20 and in the settling tank 60 so that heat loss from the water is minimized. As a result, the method and apparatus provide for recovering a high percentage of the solvents from a solvent-bearing waste material or sludge, for example, on the order of 85% to 90%, and the solids removed from the settling tank 60 by the conveyor 65 have a very low percentage of solvents so that the solids may be safely placed in a land fill.

The variable speed drive for the positive displacement pump 15 also provides for precisely metering the solvent bearing waste material into the distilling vessel 20 and may be adjusted to obtain the optimum recovery of solvents from the material within the vessel 20 according to the amount of steam introduced into the vessel, the continuous feed of the water and suspended solids from the vessel 20 to the settling tank 60 and the return of the hot water from the settling tank to the vessel 20. It is also apparent that by closing the valve 78 and opening of the valve 77, the settling tank 60 may be bypassed so that the hot water and suspended solids are directly recirculated back into the vessel 20 for further processing, for example, if the suspended solids contained an undersirably high percentage of solvents and should be further processed within the vessel 20. As mentioned above, the agitator 54 may be used to prevent settling of suspended solids within the vessel 20 and their agglomeration into a larger mass, thereby assuring the continuous removal of hot water and suspended solids from the bottom of the vessel 20.

Other desirable features are provided by the valve 18 within the top of the distilling vessel 20. That is, the valve 18 not only provides for distributing the solvent-bearing material within the upper portion of the vessel 20 and to expose the material to the steam rising from the water level 45, but is also self-releasing in response to a pressure build up within the line 16 due to the positive displacement pump 15. Thus the valve 18 prevents clogging and cooperates with the pump 15 to assure a continuous supply of material to the vessel 20 so that the treatment process is not interrupted.

While the method and form of apparatus herein described constitute a preferred embodiment of the invention, it is to be understood that the invention is not limited to the precise method and form of apparatus described, and that changes may be made therein without departing from the scope and spirit of the invention as defined in the appended claims.

The invention having thus been described, the following is claimed:

1. Apparatus for reclaiming a solvent from a solvent bearing material, comprising a distilling vessel containing a volume of liquid and defining a gas chamber above the level of the liquid, a first conduit extending from said chamber for directing a generally continuous supply of solvent bearing material to said vessel, means connected to said first conduit for spraying the solvent bearing material into said chamber above the level of the liquid, means for heating the liquid within said vessel to hold the liquid at a generally constant predetermined temperature for volatilizing the solvent within the material, a second conduit extending from said chamber for removing the volatilized solvent from said chamber, means for condensing the volatilized solvent removed from said chamber, means for agitating the liquid within the lower portion of said vessel for maintaining solid particles in suspension within the liquid, means including a third conduit connected to the bottom of said vessel for continuously removing a mixture of liquid and suspended solid particles from said vessel while solvent bearing material is being sprayed into said chamber above the liquid, means for continuously separating solid particles from the liquid after the mixture is removed from said vessel, and means for continuously returning the liquid to said vessel after the solid particles are separated from the liquid to maintain a generally constant volume of liquid within said vessel and to minimize heat loss from the liquid.

2. Apparatus as defined in claim 1 wherein said spraying means comprise a substantially positive displacement pump driven by a variable speed motor.

3. Apparatus as defined in claim 1 wherein said means for separating solid particles from the liquid comprise a settling tank, and a conveyor extending into said tank for removing solid particles which settle within said tank.

4. Apparatus as defined in claim 3 wherein said conveyor comprises an endless drag-out conveyor having an inclined run.

5. Apparatus as defined in claim 1 including means for recirculating the mixture of liquid and solid particles from the lower portion of said vessel to said chamber within the upper portion of said vessel.

6. Apparatus for reclaiming a solvent from a solvent bearing material, comprising a distilling vessel containing a volume of liquid and defining a gas chamber above the level of the liquid, a first conduit extending from said chamber for directing a generally continuous supply of solvent bearing material to said vessel, means connected to said first conduit for spraying the solvent bearing material into said chamber above the level of the liquid, said means for spraying including a valve having a self-releasing pressure responsive valve member effective to avoid clogging of said valve, means for heating the liquid within said vessel to hold the liquid at a generally constant predetermined temperature for volatilizing the solvent within the material, a second conduit extending from said chamber for removing the volatilized solvent from said chamber, means for condensing the volatilized solvent removed from said chamber, means for agitating the liquid within the lower portion of said vessel for maintaining solid particles in suspension within the liquid, means including a third conduit connected to the bottom of said vessel for continuously removing a mixture of liquid and suspended solid particles from said vessel while solvent bearing material is being sprayed into said chamber above the liquid, means for continuously separating solid particles from the liquid after the mixture is removed from said vessel, and means for continuously returning the liquid to said vessel after the solid particles are separated from the liquid to maintain a generally constant volume of liquid within said vessel and to minimize heat loss from the liquid.

7. Apparatus as defined in claim 6 wherein said valve member is spring biased against an annular seat and cooperates therewith to spray material within the upper portion of said vessel.

8. Apparatus for reclaiming a solvent from a solvent bearing material, comprising a distilling vessel containing a volume of liquid and defining a gas chamber above the level of the liquid, a first conduit extending from said chamber for directing a generally continuous supply of solvent bearing material to said vessel, means connected to said first conduit for spraying the solvent bearing material into said chamber above the level of the liquid, means for heating the liquid within said vessel to hold the liquid at a generally constant predetermined temperature for volatilizing the solvent within the material, a second conduit extending from said chamber for removing the volatilized solvent from said chamber, means for condensing the volatilized solvent removed from said chamber, a power driven rotary agitator extending into the liquid within the lower portion of said vessel for maintaining solid particles in suspension within the liquid, means including a third conduit connected to the bottom of said vessel for continuously removing a mixture of liquid and suspended solid particles from said vessel while solvent bearing material is being sprayed into said chamber above the liquid, means for continuously separating solid particles from the liquid after the mixture is removed from said vessel, and means for continuously returning the liquid to said vessel after the solid particles are separated from the liquid to maintain a generally constant volume of liquid within said vessel and to minimize heat loss from the liquid.

9. Apparatus for reclaiming a solvent from a solvent bearing material, comprising a distilling vessel containing a volume of liquid and defining a gas chamber above the level of the liquid, a first conduit extending from said chamber for directing a generally continuous supply of solvent bearing material to said vessel, means connected to said first conduit for spraying the solvent bearing material into said chamber above the level of the liquid, means for heating the liquid within said vessel to hold the liquid at a generally constant predetermined temperature for volatilizing the solvent within the material, a second conduit extending from said chamber for removing the volatilized solvent from said chamber, means for condensing the volatilized solvent removed from said chamber, means for agitating the liquid within the lower portion of said vessel for maintaining solid particles in suspension within the liquid, means including a third conduit connected to the bottom of said vessel for continuously removing a mixture of liquid and suspended solid particles from said vessel while solvent bearing material is being sprayed into said chamber above the liquid, means for continuously separating solid particles from the liquid after the mixture is removed from said vessel, said means for separating including a settling tank having an inclined wall, an endless drag-out conveyor having an inclined run adjacent said inclined wall of said tank, and means for continuously returning the liquid to said vessel after the solid particles are separated from the liquid to maintain a generally constant volume of liquid within said vessel and to minimize heat loss from the liquid.

10. Apparatus as defined in claim 9 including means for recirculating mixture of liquid and solid particles from the lower portion of said vessel to said chamber within the upper portion of said vessel and for by-passing said settling tank.

11. Apparatus as defined in claim 9 wherein said distilling vessel and said settling tank are insulated to minimize heat loss from said vessel and said tank.

* * * * *